UNITED STATES PATENT OFFICE.

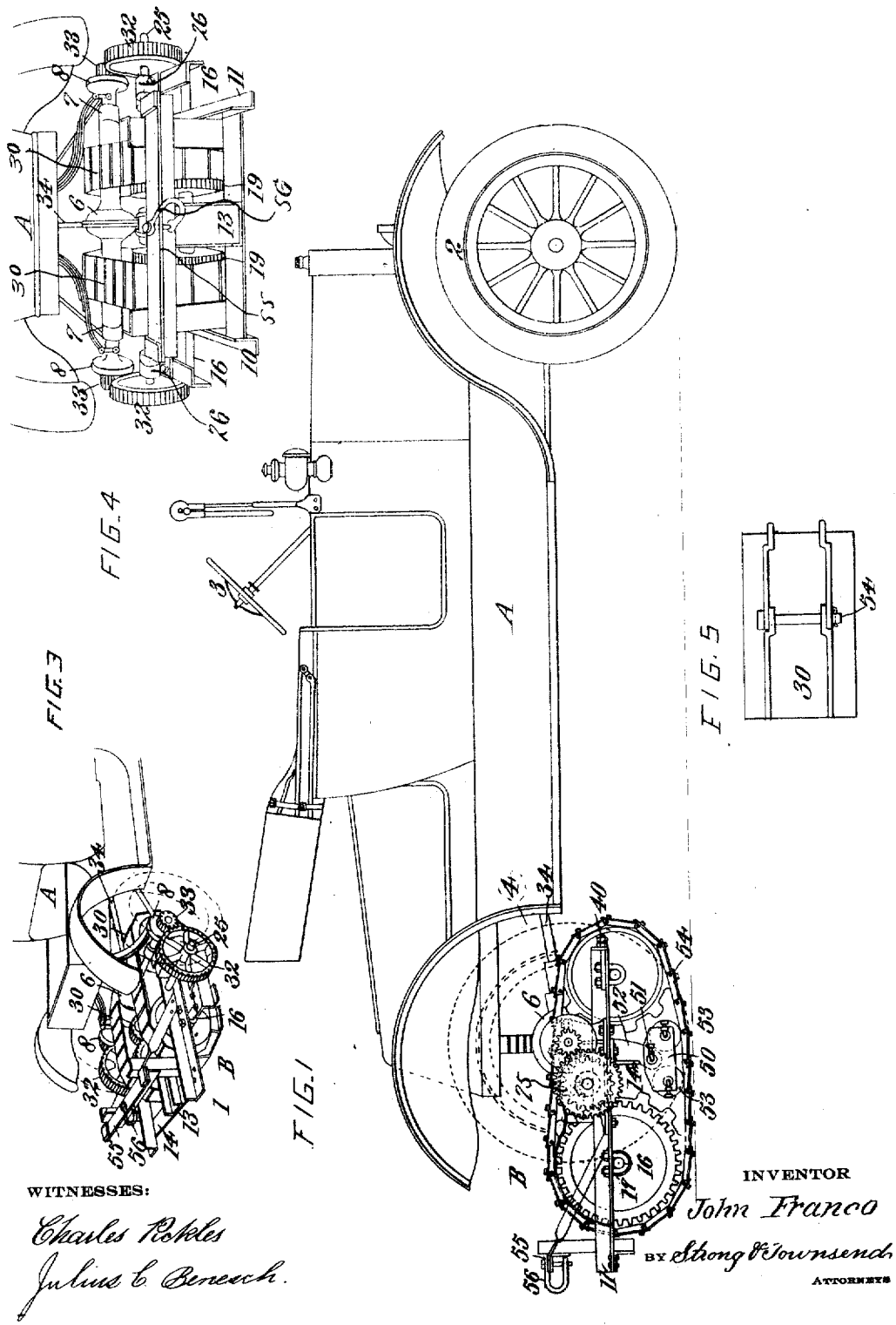

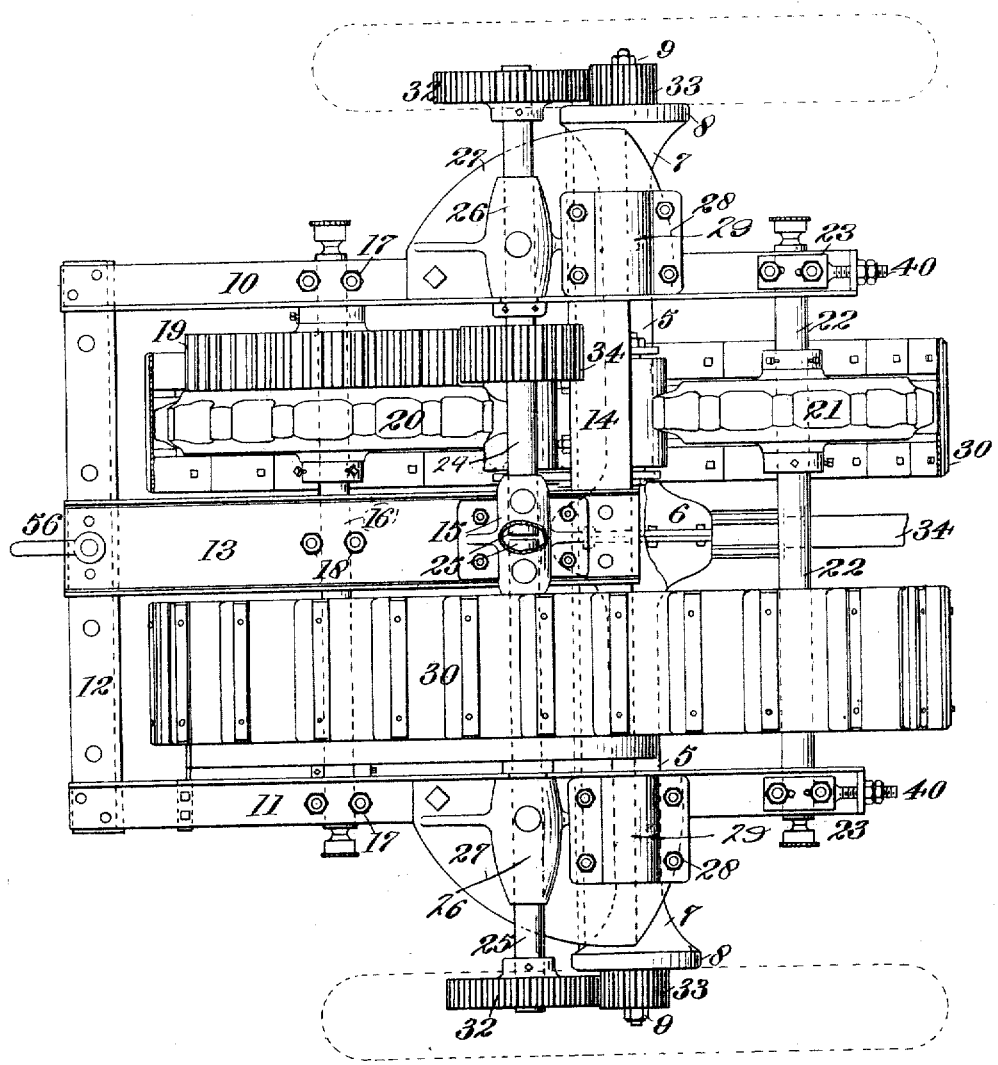

JOHN FRANCO, OF SAN JUAN BAUTISTA, CALIFORNIA.

AUTO-TRACTOR.

1,273,350.   Specification of Letters Patent.   Patented July 23, 1918.

Application filed August 1, 1917. Serial No. 183,890.

*To all whom it may concern:*

Be it known that I, JOHN FRANCO, a citizen of Switzerland, residing at San Juan Bautista, in the county of San Benito and State of California, have invented new and useful Improvements in Auto-Tractors, of which the following is a specification.

This invention relates to traction devices, and pertains especially to a tractor attachment for an ordinary automobile whereby the latter may be quickly and easily converted into a tractor of the self-laying track or link belt type, and adapted to agricultural and other uses, and still enable the automobile to be readily re-converted into a pleasure car.

The chief feature of this invention is the design, and arrangement and construction of what is in effect a diminutive link belt tractor capable of attachment and adaptation to the rear axle of an ordinary automobile, so that by simply removing the hind wheels of the automobile and gearing the rear drive axle of the automobile back to the attachment, any one having need for such a tractor may have one at small expense.

Among the objects of the invention are: to adapt such an attachment to go in a minimum of space and have a maximum of tractive power; to arrange the device between the rear wheels or within the space where the rear wheels ordinarily are so that the width of the machine is not increased, allowing the device to operate among trees and in narrow spaces; to adapt the ordinary differential drive of an auto to the successful operation of a self-laying track attachment without the use of brakes.

Further objects will hereinafter appear.

Having reference to the accompanying drawings—

Figure 1 is a side elevation of an automobile showing the application of the tractor.

Fig. 2 is a plan view of the truck supporting the transmission gears and the endless, self-laying chain tracks driven by same, said plan view being partly in section to show the position of the gears.

Figs. 3 and 4 are perspectives of the attachment.

Fig. 5 is a plan view of a track link.

Referring to the drawings in detail, A indicates a suitable form of motor vehicle, 2 the front wheels which are controlled from a steering wheel 3 in the usual manner, 4 the rear wheels, 5 the rear driving shaft, 6 the differential housing, 7 the axle housing, 8 the brake drums, 9 the axle spindles on which the rear wheels 4 are secured, and B the tractor attachment in general.

The tractor attachment consists of a U-shaped frame which is preferably constructed of angle and channel iron bars, such as indicated at 10, 11, 12, 13 and 14. The angle bars 10 and 11 form the sides of the truck, the bar 12 the end, the bar 14 a cross bar tying the side sections together, and the channel plate 13 a support for a central bearing member 15 and a rear shaft 16. This shaft is rigidly secured at each end by means of U-bolts 17 to the side frames and by a U-bolt 18 to the channel plate 13. The shaft thus secured cannot revolve and, therefore, will not only serve as a cross bar connecting the side frames but it will also serve as a bearing shaft for a pair of driving gears 19 and a pair of connected driving sprockets 20; one sprocket and driving gear 19 being bolted or otherwise secured together to drive in unison and each set being positioned in alinement with an idler sprocket 21 which is journaled to rotate on a front shaft 22 which is secured to the forward end of the side frames by U-bolts 23, in this manner also serving as a cross bar between the side frames. The side frames, together with the channel plate 13, also serve as a support for an intermediate shaft which in this instance is divided into two sections indicated at 24 and 25, each shaft section being supported at the outer end by a bearing member 26 and at the inner end in the central bearing member 15.

The journals 26 are preferably cast integral with a bracket plate 27, which in turn is secured to each side frame, and a second bearing 28 provided with a removable cap 29 is also formed on each bracket plate 27 to permit the frame as a whole to be pivotally secured on the axle housing 7, as shown in Fig. 2. Each pair of alined sprockets 20 and 21 supports an endless, self-laying propelling track 30 and power to drive said tracks is transmitted to the gears 19 through intermeshing intermediate gears 31 which are secured upon the divided intermediate shaft sections 24 and 25, power being in turn transmitted to each intermediate shaft section through gears 32, secured one on each end of the divided intermediate shaft, in a position where they are adapted to constantly intermesh with a pair of driving pinions 33 secured one on each axle spindle 9. Power transmitted through the propeller shaft 34 from the engine contained in the vehicle is in this manner transmitted through the differential 6 and the rear driving shaft to the driving pinions 33 secured upon the axle spindles and is here retransmitted through the gears 32, the intermediate shaft sections 24 and gears 31 to the driving gears 19, which in turn drive the sprockets 20 and the endless track members supported thereby.

The dividing of the intermediate shaft permits the differential 6 to transmit power to either track member when the tractor is turning a corner and also permits the power to be equally distributed to each track member under normal driving conditions either reverse or ahead. Also any speed may be transmitted through the propeller shaft by the usual transmission employed.

The construction of the truck frame supporting the transmission gears and the self-laying track members is one of the important features of the present invention, that is, the stationary shafts 16 and 22 employed serve as cross braces to connect the side bars of the frame, thereby increasing the strength and rigidity of the structure as a whole without additional braces or rods. The rigid frame construction thus provided prevents the intermeshing gears from binding and always maintains a perfect alinement between same, in this manner increasing the life and durability of the attachment as a whole. The two bearing members 26 and 28 on the single bracket plate 27 are also an important feature as they not only provide a bearing for the intermediate shaft but they also serve to maintain a fixed spacing or distance between the gears 32 and 33 regardless of the ground formation over which the tractor passes or the incline of same.

The bearing caps 29 permit the tractor attachment as a whole to be quickly attached or detached with relation to the rear axle housing and at the same time permit a free pivotal movement of the tractor about the housing, thus allowing the self-laying track members, together with the truck, to swing freely on the axle housing when passing over undulations or uneven ground formations. The self-laying track members will, of course, have to be disconnected every time the tractor is to be applied, but as this is accomplished by merely removing a link pin, it can readily be seen that comparatively little time is lost.

The track members are preferably passed over the axle housing to permit as great a swinging movement of the truck proper as possible about the axle housing, and as comparatively small clearance is provided between the axle housing and the underside of the track chains a pair of wearing plates (one for each chain) are preferably clamped upon the axle housing at a point in alinement with the under side of the chain tracks. Any wear or rubbing action that might take place is in this manner obviated. Any slack in the chain that might produce unnecessary wear or rub on the plate may be taken up by the adjusting screws 40, as shown in Fig. 2.

While the tractor attachment is here shown as applied to a "Ford" automobile, it may, of course, be attached to any standard type of motor vehicle and the attachment may be made without making any alterations or changes in the construction of the car proper, that is, it is only necessary to remove the rear wheels and secure the pinions 33 upon the axle spindles. The truck frame is then attached by applying the bearing caps 29 and the chain tracks may then finally be placed in position and connected. The height of the truck and the parts carried thereby is such that all standard parts, such as springs, fenders, etc., are cleared, permitting the attachment to be made without removing anything but the rear wheels 4. This is of considerable importance as it not only reduces the time involved but it also leaves the car in condition for ordinary use whenever desired.

Another important feature of the present construction is the arrangement of the self-laying tracks. They are placed comparatively close together entirely under the vehicle frame or inside of the lines assumed by the rear driving wheels. The width of the machine is, therefore, not increased and it is possible to drive much closer to trees or fences when plowing than would otherwise be the case. The individual track laying members being separately driven through the differential 6 may travel at variable speeds when the car is turning a corner and the lower portion of each track member may be suitably supported to present the largest traction surface possible, a pivotally mounted truck 50, such as shown in Fig. 1, being preferably provided for this purpose. This truck is pivoted, as at 51, on a bracket arm 52 secured upon the cross bar 14, and two or more rollers, such as indicated at 53, may be employed, if desired. The pivotal mounting of the truck permits a perfectly free movement of same, thus permitting the track members proper to give when passing over cobbles or other undulations. There is one truck 50 for each track member.

The complete assembly of the U-shaped tractor frame which is open at the front except for the rigid cross shaft 11 to allow for the ready entry of the rear axle, differential and transmission shaft of the automobile, constitute in effect a diminutive traction engine, but in which the power plant is carried on the automobile. No undue strains are put upon the automobile; the tractor attachment carries and propels the automobile and its own tractive force is sufficient to haul any reasonable load attached at any suitable point to the tractor frame. As here shown, the rear part of the frame has an up-standing suitably braced cross-draft bar 55 to which a clevis 56 is attached; the plows or other implements to be hauled being connected at the clevis 56.

The materials and finish of the several parts here employed may otherwise be such as the experience and judgment of the manufacturer may dictate.

It is understood that various changes in form, proportions and details of construction may be resorted to within the scope of the appended claims, and that I do not limit myself to the specific design and construction here shown.

Having thus described my invention, what I claim and desire to secure by Letters Patent is—

1. In a tractor attachment for automobiles having a differential gear in the rear axle, an independent tractor frame supported upon endless, self-laying tracks disposed between the axle spindles and the differential, means to pivotally support the rear end of the automobile upon the tractor frame, and means to transmit power from the rear axle to the tractor attachment.

2. The combination with the rear driving axle on a motor vehicle and the axle housing surrounding same, of a frame adapted to be pivotally attached to the axle housing, a pair of driving pinions adapted to be secured one on each axle spindle, an intermediate shaft journaled on the frame, a gear on each end of said shaft intermeshing with the driving pinions, a pair of endless flexible track members on the frame, and means for transmitting power from the rear axle to drive the track members.

3. In a tractor attachment for automobiles having a differential gear in the rear axle, an independent tractor frame supported upon endless, self-laying tracks disposed between the axle spindles and the differential, means to pivotally support the rear end of the automobile upon the tractor frame, means to transmit power from the rear axle to the tractor attachment, said means comprising driving pinions on each axle spindle, an intermediate shaft journaled on the tractor frame and geared to the driving pinions, stationary shafts secured crosswise at the front and rear ends of the tractor frame, gear sprockets on the rear shaft to support the rear end of and drive the tracks, idlers on the front shaft to support the front end of the tracks, and gears on the intermediate shaft intermeshing with the gear sprockets on the rear shaft.

4. The combination with the rear driving axle on a motor vehicle and the axle housing surrounding same, of a frame adapted to be pivotally attached to the axle housing, a pair of driving pinions adapted to be secured one on each axle spindle, a divided intermediate shaft journaled on the frame, a gear on each end of said shaft intermeshing with the driving pinions, a pair of endless flexible track members on the frame, and means for transmitting power from the rear axle to drive the track members.

5. The combination with the rear driving axle on a motor vehicle and the axle housing surrounding same, of a frame, a pair of bearing members on the frame adapted to receive the outer ends of the axle housing, said bearings permitting the frame to swing freely on the axle housing, a removable cap on each bearing member permitting the frame to be quickly removed or attached, a second pair of bearing members formed integral with the axle housing bearings, a divided intermediate shaft journaled in said bearing, a pair of driving pinions adapted to be secured one on each axle spindle, a gear on each end of the intermediate shaft intermeshing with the driving pinions, a pair of endless flexible track members, sprockets journaled in the frame supporting the track members, and means for transmitting power from the intermeshed shaft to drive said sprockets.

6. The combination with the rear driving axle on a motor vehicle and the axle housing surrounding same, of a frame, a pair of bearing members on the frame adapted to receive the outer ends of the axle housing, said bearings permitting the frame to swing freely on the axle housing, a removable cap on each bearing member permitting the frame to be quickly removed or attached, a second pair of bearing members formed integral with the axle housing bearings, a divided intermediate shaft journaled in said bearing, a pair of driving pinions adapted to be secured one on each axle spindle, a gear on each end of the intermediate shaft intermeshing with the driving pinions, a pair of stationary shafts secured crosswise of the frame one on the front and one on the rear end of the frame, a pair of driving sprockets journaled on the rear shaft, a pair of driving gears journaled on said shaft, one gear being secured to each driving sprocket, a pair of idlers journaled on the front shaft in alinement with the driving sprockets, an endless flexible track member supported by each sprocket and idler, and gears on the intermediate shaft intermeshing with the driving gears on the rear shaft.

7. In a tractor attachment for automobiles, a U-shaped frame, a pair of bearing members on the frame adapted to receive the rear axle housing of the automobile, said bearings permitting an oscillating movement of the frame on the axle housing, a pair of stationary shafts extending crosswise of the frame serving as cross-bar braces for same, a pair of sprocket gear wheels journaled on each shaft, and endless flexible track members carried by the sprockets interiorly of the U-shaped frame.

8. In a tractor attachment for automobiles, a U-shaped frame, a pair of bearing members on the frame adapted to receive the rear axle housing of the automobile, said bearings permitting an oscillating movement of the frame on the axle housing, a pair of stationary shafts extending crosswise of the frame serving as cross-bar braces for same, a pair of sprocket gear wheels journaled on each shaft, endless flexible track members carried by the sprockets interiorly of the U-shaped frame, and means for transmitting power from the driving shaft of the automobile to drive the sprockets and the track members carried thereby.

9. The combination with an automobile having a differential gear in its rear axle, of a tractor attachment consisting of a self-laying track tractor supported upon tracks extending around the automobile axle between the spindles and the differential thereof, pivotal supports for said axles upon the tractor attachment, and driving connections whereby the motive power of the automobile is transmitted through the differential of the rear axle to each track.

In testimony whereof I have hereunto set my hand in the presence of two subscribing witnesses.

JOHN FRANCO.

Witnesses:
 W. W. HEALEY,
 M. E. EWING.